United States Patent [19]
Anello et al.

[11] 3,821,290
[45] June 28, 1974

[54] POLYFLUOROISOALKOXYALKYL SULFONIC ACIDS

[75] Inventors: Louis G. Anello, Orchard Park; Richard F. Sweeney, Elma, both of N.Y.

[73] Assignee: Allied Chemical Corporation, New York, N.Y.

[22] Filed: Mar. 1, 1971

[21] Appl. No.: 119,957

[52] U.S. Cl. ...... 260/513 R, 260/435 R, 260/448 R, 260/543 R, 260/543 F, 260/543 H, 252/353, 252/355, 252/6.5, 252/8.05
[51] Int. Cl. .......................................... C07c 143/02
[58] Field of Search ................................ 260/513 R

[56] References Cited
FOREIGN PATENTS OR APPLICATIONS
1,145,964   3/1969   Great Britain .................. 260/513 R Primary Examiner—Leon Zitver
Assistant Examiner—Nicky Chan
Attorney, Agent, or Firm—Anthony J. Stewart; Jay P. Friedenson

[57] ABSTRACT

Polyfluoroisoalkoxyalkyl sulfonic acids, which have a terminal polyfluorinated branched chain-or cyclic-perhaloisoalkoxy group linked through an ether oxygen to a perfluoromethylene substituent, and certain salt and acid halide derivatives thereof are useful as surface active agents, as emulsifying agents, as strong acid catalysts for organic reactions, as components of dry powder fire-extinguishing compositions, as oil- and water-repellent agents and as intermediates in the preparation of other polyfluoroisoalkoxyalkyl sulfonyl-substituted compounds.

6 Claims, No Drawings

POLYFLUOROISOALKOXYALKYL SULFONIC ACIDS

CROSS-REFERENCES TO RELATED APPLICATIONS

Copending U.S. application of L. G. Anello, R. F. Sweeney and M. H. Litt Ser. No. 818,832 filed Apr. 23, 1696, now abandoned, entitled "Polyfluoroisoalkoxyalkyl Halides".

Copending U.S. application of R. F. Sweeney, A. K. Price and A. V. Khan, Ser. No. 818,825 entitled "Polyfluoroisoalkoxyalkyl Amido Carboxylic Acids and Salts Thereof", filed Apr. 23, 1969, now Pat. No. 3,644,513.

BACKGROUND OF THE INVENTION

This invention relates to novel fluorinated aliphatic sulfonic acids characterized by a terminal fluorinated perhaloisoalkoxy substituent and to certain salt and acid halide derivatives thereof.

The present invention covers a novel class of fluorocarbon sulfonic acids which have a terminal polyfluorinated branched chain- or cyclic-perhaloisoalkoxy group linked through an ether oxygen to a perfluoromethylene substituent. These compounds in free acid or salt form are surface active agents of unusual activity and in salt form also impart oil- and water-repellency to textiles, paper and other substrates. We have also found novel acid halide derivatives of these acids which can be utilized as intermediates in preparation of other valuable fluorinated isoalkoxyalkyl sulfonyl-substituted oil and water repellent agents.

One object of the present invention is the provision of novel fluorocarbon sulfonic acids.

Another object is the provision of simple salt and acid halide derivatives of these novel acids.

A further object of the invention is the provision of novel fluorocarbon sulfonic acids and derivatives thereof having surfactant properties.

A still further object of the invention is the provision of novel fluorocarbon sulfonic acids and derivatives thereof which are useful in the preparation of other useful fluorocarbon sulfonyl-substituted compounds.

These and additional objects and advantages will be apparent from the following description of our invention.

SUMMARY OF THE INVENTION

The above objects are attained according to the invention in novel fluorocarbon compounds represented by the general formula

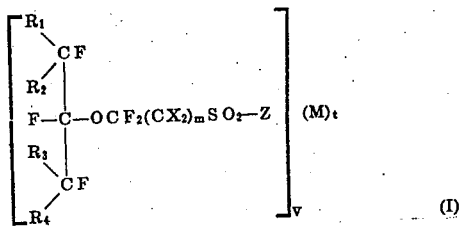

(I)

wherein i. $R_1$, $R_2$, $R_3$ and $R_4$ are independently at each occurrence fluorine, chlorine or perhaloalkylyl having from 1 to 9 carbon atoms or $R_1$ and $R_3$ when taken together, are perhaloalkylene groups forming a homocyclic aliphatic structure of from 4 to 6 carbon atoms which halo substituents thereof are fluorine or chlorine with the proviso that no more than three of the $R_1$–$R_4$ groups are perhaloalkyl groups ii. X, which may be the same or different in different $CX_2$ groups is hydrogen or fluorine iii. $m$ is 0 or an integer 1 to 39 iv. Z is fluorine, chlorine or oxygen v. M is hydrogen or a radical selected from ammonium, metals of Groups IA, IB, IIA, IIB of the Periodic Table, aluminum and lead vi. $v$ is 1 when Z is fluorine or chlorine and is an integer 1 to 3 equal to the valence of M when Z is oxygen vii. $t$ is 0 when Z is fluorine or chlorine and is 1 when Z is oxygen.

The criticality in the molecule of the novel compounds of the invention is in the presence of the terminal sulfonyl substituent and in the structure of the fluoroisoalkoxyperfluoroalkylene portion of the molecule. The latter structure is critically characterized by the presence of an ether oxygen atom simultaneously linked to (a) a carbon atom linked to a fluorine atom as well as to two fluorinated perhaloalkyl groups and (b) a perfluoromethylene or higher perfluoroalkylene group. The aforementioned fluorinated perhalo alkyl groups are characterized by the presence of at least one fluorine substituent on each carbon adjacent to the carbon linked to the ether oxygen atom. The fluorinated perhaloalkyl groups when taken together from a homocyclic aliphatic structure.

DETAILED DESCRIPTION OF THE INVENTION AND PREFERRED EMBODIMENTS THEREOF

The novel compounds of the invention can be prepared by various hereinafter described methods from the corresponding fluorinated isoalkoxyalkyl primary iodides having the formula (II)

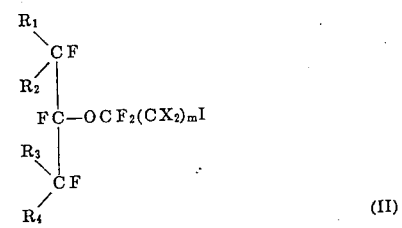

(II)

wherein $R_1$, $R_2$, $R_3$ and $R_4$, X and m have the meanings given above.

Iodide starting materials delineated by II are fluoroperhaloisoalkoxyperfluoromethyl iodides (II, $m$=o) fluoroperhaloisoalkoxy tetra- or difluoroethyl iodides (II, $m$=1, X=fluorine and II, $m$=1, X=hydrogen respectively) hereinafter referred to as telogen iodides and their condensation, that is telomerization, products with a telomerizable olefin selected from ethylene, tetrafluoroethylene and vinylidene fluorine which condensates are hereinafter referred to as telomer iodides.

Telogen iodides of formula II wherein $m$ is 1 and X is fluorine are disclosed by Litt et al, U.S. Pat. No.

3,453,333 issued July 1, 1969 and by Evans et al. U.S. Pat. No. 3,470,256 issued Sept. 30, 1969.

Telogen iodides of formula II wherein $m$ is 0 are prepared from the foregoing telogen iodides (II) wherein $m$ is 1 and X is fluorine by liquid phase reaction with sulfur trioxide at 50–175°C to replace the iodide substituent with the radical —COF, hydrolysis of the resultant acyl fluoride to the corresponding carboxylic acid, neutralization of the resultant carboxylic acid with alkali-free silver oxide and finally iodination of the resultant silver carboxylate to form, via concurrent decarboxylation, the desired telogen iodide (II) wherein $m$ is 0. The foregoing conversion of telogen iodides of formula (II) wherein $m$ is 1 and X is fluorine to the corresponding telogen iodide of formula II wherein $m$ is 0 is more particularly described in the copending application of Anello et al., U.S. patent application Ser. No. 818,832 filed Apr. 23, 1969 entitled "Polyfluoroisoalkoxyalkyl Halides", the pertinent subject matter of which is incorporated herein by reference.

Telogen iodides represented by formula II wherein $m = 1$ and X = hydrogen can be readily prepared from the aforementioned telogen iodide of formula II wherein $m = 1$ and X = fluorine by the above described conversion of the terminal —CF$_2$I group to the acyl fluoride group, —COF, esterification of the terminal —COF group with a lower aliphatic alcohol to form a terminal alkyl carboxylate group, reduction of the latter ester group to —CH$_2$OH with lithium aluminum hydride, esterification of the latter terminal primary alcohol group by reaction with p-toluene sulfonyl chloride, and conversion of the resultant p-toluenesulfonate ester group by reaction with alcoholic potassium iodide to the terminal —CH$_2$I group thereby obtaining the iodide represented by formula II $m = 1$, X = hydrogen. The aforementioned conversion of the terminal acyl fluoride group to the corresponding —CH$_2$OH group is more particularly described in Canadian Pat. No. 852,256 of L. G. Anello et al. issued September 22, 1970. The foregoing procedure for converting the terminal primary alcohol group to the terminal —CH$_2$I group is conventional in the art being disclosed in Method 208, Lovelace et al. "Aliphatic Fluorine Compounds" Rheinhold Publishing Corp., 1958, p.42.

The aforementioned telomerization of the foregoing telogen iodides with ethylene, tetrafluoroethylene or vinylidene fluoride, which may be effected stepwise employing different telomerizable olefins in the various steps is carried out in accordance with the procedure of Anello et al. U.S. Pat. No. 3,514,487 issued May 26, 1970. As is disclosed in the aforementioned copending U.S. application of Anello et al. Ser. No. 818,832 telomerization reactions of the aforementioned telogen iodides with vinylidene fluoride provide two telomer products, namely a principal telomer product wherein the alkyl residue of the telogen iodide is attached to the methylene group in the telomer and the iodide residue of the telogen is attached to the difluoromethylene group in the telomer product and a minor product wherein the alkyl residue of the telogen is attached to the difluoromethylene group in the telomer and the iodide residue to the methylene group in the telomer product, which products are readily separated by conventional techniques.

The novel sulfonyl compounds of the invention are prepared from the above described iodides (II) by the following synthetic routes.

Sulfonyl chlorides of the invention (represented by formula I above, Z = chlorine, $t = 0$, $v = 1$) wherein the sulfur atom is bonded to a non-fluorinated methylene group are readily prepared from the corresponding iodide (II) by reaction of the latter with an alkali metal thiocyanate to obtain the corresponding fluorinated perhaloisoalkoxyalkyl thiocyanate which is oxidized with elemental chlorine to the desired sulfonyl chloride according to conventional reaction techniques. The thiocyanation of the iodide is conveniently carried out at about 40–150°C especially at about 80–110°C at atmospheric or superatmospheric pressures employing, conventionally an inert organic solvent such as ethanol, diethylene glycol, dimethyl formamide or especially a dialkyl sulfoxide such as dimethyl sulfoxide. Conveniently about 1 to 3 or more molar proportions of the alkali metal thiocyanate per mole of the iodide and about 1 to 2 molar proportions of the solvent per mole of the alkali metal thiocyanate are employed. The thiocyanation of fluorinated aliphatic iodides with alkali metal thiocyanates is more particularly described in French Pat. No. 1,561,360, issued Feb. 17, 1969. The oxidation of the resultant fluorinated perhaloisoalkoxyalkyl thiocyanate with chlorine to the desired corresponding sulfonyl chloride is conveniently affected in a water-acetic acid mixture containing about 5 to 25 volume percent water at about 25 to 125°C especially at about 40 to 75°C in substantial accordance with the reaction technique more particularly described in Belgium Pat. No. 737,014, issued Jan. 16, 1970.

Sulfonyl chlorides of the invention in which the sulfur atom of the sulfonyl group is attached to a fluorinated methylene group, that is, to perfluoromethylene, are conveniently prepared by reaction of the corresponding fluorinated isoalkoxyalkyl iodide with excess elemental sulfur to form the corresponding bis(fluoroisoalkoxyalkyl)disulfide, reaction of the latter disulfide with molecular chlorine to obtain the corresponding fluorinated isoalkoxyalkyl sulfenyl chloride followed by reaction of the sulfenyl chloride with aqueous chlorine to obtain the desired sulfonyl chloride in accordance with known reaction techniques.

The conversion of the iodide to the corresponding disulfide is advantageously carried out by heating the iodide with a stoichiometric excess of elemental sulfur at about 400 to 450°C under autogenous pressure and recovering the disulfide by filtration of the cooled liquid reaction mass in substantial accordance with the procedure described by R. N. Haszeldine and V. M. Kidd, J. Chem. Soc. 3871 (1955).

The disulfide is converted to the corresponding sulfenyl chloride by reaction with a stoichiometric excess of molecular chlorine under ultra violet radiation and substantially anhydrous conditions at ambient temperature for about 10–15 days followed by conventional distillation of the reaction mass to recover the desired sulfenyl chloride in accord with the conventional synthetic technique of R. N. Haszeldine and J. M. Kidd, J. Chem. Soc. 3219 (1953).

The sulfenyl chloride is converted to the corresponding desired sulfonyl chloride by oxidizing the sulfenyl chloride with a stoichiometric excess of molecular chlorine in water at ambient temperature in accordance with the conventional synthetic technique of R. N. Haszeldine and J. M. Kidd, J. Chem. Soc. 2901 (1955).

The novel sulfonyl fluorides of the invention (represented by formula I above Z = fluorine $t = 0$ $v = 1$) are prepared from the corresponding sulfonyl chlorides by reaction of the sulfonyl chloride with at least a stoichiometric proportion of potassium bifluoride in water at about ambient temperature to about 80°C especially at about 70°C. The sulfonyl fluoride is extracted with diethyl ether from the aqueous reaction mass and the ethereal extract is dried and evaporated to dryness to recover the sulfonyl fluoride which may be further purified by conventional fractional distillation under diminished pressure. The foregoing technique used to convert sulfonyl chlorides of the invention to the corresponding novel sulfonyl fluorides is conventional being disclosed by J. E. Millington et al., J. Am. Chem. Soc. 78, 3846 (1956).

Novel fluorinated isoalkoxyalkyl sulfonic acids of the invention (represented by formula I above, Z = oxygen, M = hydrogen, $t = 1$, $v = 1$) are readily obtained by conventional aqueous hydrolysis of the corresponding sulfonyl chlorides or fluorides, the preparation of which is described above. The hydrolysis is conveniently effected by heating the sulfonyl halide with water at about 100°C for about 6 to 10 hours, and thereafter extracting the reaction mass with diethyl ether. The ethereal extract containing the desired sulfonic acid is distilled to remove the ether and thereby recover the acid.

The sulfonic acids of the invention wherein the sulfonic acid group is attached to a non-fluorinated methylene group can also be prepared by aqueous nitric acid oxidation of the corresponding fluorinated isoalkoxyalkyl thiocyanates the preparation of which is described above. The nitric acid oxidation is advantageously carried out at about 70 to 150°C employing at least about a stoichiometric proportion of nitric acid, that is at least about 13 moles of nitric acid per mole of the thiocyanate, but especially a stoichiometric excess of nitric acid is used, that is nitric acid is charged in an amount corresponding to up to about 30 moles nitric acid per mole of the thiocyanate.

Advantageously the nitric acid is charged as a 35 to 50 weight percent aqueous solution. The product sulfonic acid is recovered from the reaction mass by conventional extraction with diethyl ether followed by evaporation of the ethereal extract to dryness.

The novel metal salts of the present fluorinated isoalkoxyalkyl sulfonic acids can be conveniently prepared from the corresponding sulfonic acids by treating the acid in aqueous media with at least a stoichiometric proportion of a water-soluble inorganic salt of the metal, advantageously a metal sulfate, extracting the metal sulfonate product from the reaction mass with aqueous ethanol, and evaporation of the alcoholic extract to dryness to recover the desired metal sulfonate salt.

The novel sulfonate salts of the invention can also be produced from the corresponding sulfonic acids by conventional neutralization of the latter with a basic hydroxide, oxide or carbonate of the metal in aqueous media.

The salts of the present sulfonic acids can also be readily prepared by conventional aqueous hydrolysis of the corresponding sulfonyl chloride in the presence of a basic hydroxide of the metal in substantial accord with the technique disclosed in aforementioned Belgian Pat. No. 737,014.

Metal sulfonates of the invention wherein the sulfonate group is attached to a non-fluorinated methylene substituent can be obtained directly from the corresponding fluorinated isoalkoxyalkyl iodide by reaction of the latter with at least a molar proportion of a sulfite salt of the metal per mole of the iodide. This reaction technique, which involves use of a polar reaction solvent such as water is ethanol, acetone, dimethylsulfoxide or dimethylformamide, reaction temperatures of about 20° to 250°C, especially about 50 to 150°C, and reaction pressures greater than atmospheric when the reaction temperature is above the boiling point of the solvent, is more particularly described in aforementioned Belgian Pat. No. 737,014. Typical salts of the present sulfonic acids which are contemplated by the invention include the ammonium, lithium, sodium, potassium, magnesium, calcium, barium, strontium, copper, silver, zinc, cadmium, aluminum and plumbous salts of these novel acids.

In preferred compounds of the invention $R_1$, $R_2$, $R_3$ and $R_4$ are fluorine. Preferably also the invention is directed to compounds in which Z is oxygen, that is to sulfonic acids and salts thereof, especially the ammonium and alkali metal salts thereof.

Perfluoroisoalkoxyalkyl sulfonyl compounds of the invention represented by formula I wherein $R_1$, $R_2$, $R_3$ and $R_4$ are fluorine or perfluoroalkyl and X is fluorine constitute an especially preferred group of oxidation-resistant compounds according to the invention.

An additional especially preferred class of compounds of the invention are sulfonic acids of formula III

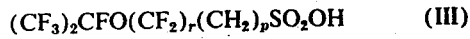

$$(CF_3)_2CFO(CF_2)_r(CH_2)_pSO_2OH \qquad (III)$$

wherein $r$ and $p$ are each integers 1 to 20 and their ammonium salts and alkali metal salts, that is salts of metals of Group IA of the Periodic Table.

The novel sulfonic acids of the invention and their ammonium and metal salts are surface active agents highly effective in lowering the surface tension of aqueous or non-aqueous systems. In this regard the novel sulfonic acids and their alkali metal salts which are soluble in water are useful as aqueous dispersing agents, emulsifying agents, and detergents.

The sulfonate salts of the invention including the sulfonate salts of ammonia, the Group IA and IB, Group IIA and IIB metals and of aluminum and divalent lead can be employed as the fluorocarbon surfactant component of dry (non-aqueous) powder fire entinguishing compositions which contain a pulverulent inorganic salt such as sodium bicarbonate, potassium bicarbonate, magnesium bicarbonate, ammonium sulfate, ammonium phosphate calcium carbonate or a mineral barytes in intimate admixture with about 0.1 to 5 percent of the fluorocarbon surfactant based on the weight of the extinguishant. Fluorocarbon surfactant-containing dry powder fire extinguishing compositions of this type are more particularly described in the copending U.S. application of Sweeney et al., Ser. No. 818,825 filed Apr. 23, 1969 entitled "Polyfluoroisoalkoxyalkyl Amido Carboxylic Acids and Salts Thereof", the pertinent subject matter of which is incorporated herein by reference.

All of the novel sulfonate salts of the invention are also useful as surfactant additives to organic lubricants and plasticizers. Lubricants and plasticizers containing organic surfactants are disclosed by Maurer et al., U.S. Pat. No. 3,305,578 issued Feb. 21, 1967.

All of the novel sulfonate salts of the invention, particularly the above-described sulfonate salts of polyvalent metals, such as divalent calcium, are highly effective in imparting oil- and water-repellency to various substrates such as paper and textiles such as cellulose. The salts are applied to such substrates by conventional techniques such as padding or immersion of the substrate material in an aqueous or alcoholic solution containing about 1 to 10 weight percent of the sulfonate salt followed by evaporation of the aqueous or alcoholic solvent from the impregnated material.

The novel sulfonic acids of the invention are exceptionally strong acids which can be employed as acidic catalysts in organic reactions particularly reactions of fluorinated organic compounds. The perfluorinated sulfonic acids of the invention which are particularly resistant to oxidation as noted above are especially useful in this connection.

The novel sulfonyl chlorides and fluorides of the invention are useful as intermediates not only in preparation of the present novel sulfonic acids and salts but also in the preparation of other valuable compounds containing fluorinated isoalkoxyalkyl sulfonyl substituents. For example the novel sulfonyl halides of the invention can be reacted according to known techniques with a primary aliphatic amine advantageously containing an ionogenic substituent such as a terminal quaternary aliphatic ammonium salt group to obtain valuable fluorinated isoalkoxyalkylsulfonamido- surfactants and oil- and water-repellent agents.

In the following examples which illustrate our invention proportions and percentages are by weight unless otherwise indicated and temperatures are in degrees centigrade.

EXAMPLE 1

Into a 500 ml., 3-neck flask is placed 200 ml. of dimethylsulfoxide and 50 g. (0.52 mole) of potassium thiocyanate. The slurry is heated to 60°C and 160 g. (0.365 mole) of $(CF_3)_2CFOCF_2CF_2CH_2CH_2I$ is rapidly added. The temperature of the mixture is raised to 100°C and maintained at 100°C for 5 hours. The mixture is then cooled to 25° and washed with water. The water-insoluble oil which is recovered is dried and distilled under diminished pressure to give 120 g. (0.32 mole, 89% yield) of the organic thiocyanate b.p. 87–89°/15 mm. Hg which has the structural formula $$(CF_3)_2CFO(CF_2)_2(CH_2)_2SCN$$

The infrared spectrum of the product which exhibits a characteristic thiocyanate group absorption band at 4.60–4.62 microns is consistent with the assigned structural formula.

Analytical Data

Calcd. for $C_8F_{11}H_4SN$: C, 25.88; F, 56.33; H, 1.08; S, 8.63.
Found: C, 26.05; F, 56.72; H, 0.92; S, 8.21.

Into a 250 ml 3 neck flask is placed a mixture of 60 g. (0.16 mole) of $(CF_3)_2CFOCF_2CF_2CH_2CH_2SCN$, prepared as described above, 40 g. of glacial acetic acid a 7 g. (0.39 mole) of water. The mixture is heated to 55° and for 8 hours chlorine gas is passed below the surface of the reaction mass. During the addition of chlorine the temperature of the reaction mixture rises to 62° due to the exothermic character of the reaction which occurs. The reaction mixture is then cooled to ambient temperature and is filtered to remove by-product crystallized cyanogen chloride. The resultant filtrate is distilled under diminished pressure to give 64 g. (0.15 mole) of the desired organic sulfonyl chloride product, b.p. 89°/15 mm Hg. having the structural formula $$(CF_3)_2CFO(CF_2)_2(CH_2)_2SO_2Cl$$

The infrared spectrum of this product, which exhibits a characteristic sulfonyl chloride group absorption band at 7.15–7.25 microns is consistent with the assigned structural formula.

Analytical Data

Calcd. for $C_7F_{11}H_4ClSO_3$: C, 20.36; F, 50.67; S, 7.76; Cl, 8.61.
Found: C, 20.82; F, 51.12; S, 8.03; Cl, 8.48.

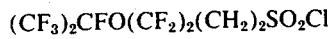

EXAMPLE 2

In substantial accord with the procedure of Example 1, 60 g. (0.62 mole) of potassium thiocyanate in 200 ml. of dimethyl sulfoxide are heated with 160 g. (0.30 mole) of $(CF_3)_2CFO(CF_2CF_2)_2CH_2CH_2I$ at a temperature of 80 to 100° for 3 hours. The recovered oil is dried and distilled under diminished pressure to give 35 g. (0.065 mole) of unreacted $(CF_3)_2CFO(CF_2CF_2)_2CH_2CH_2I$, b.p. 66°/15 mm. and 110 g. (0.2 mole, 100% yield) of the organic thiocyanate, b.p. 108–112°/15 mm. having the structural formula $$(CF_3)_2CFO(CF_2)_4(CH_2)_2SCN$$

The infrared spectrum of this product which exhibits a characteristic thiocyanate group absorption band at 4.60–4.62 microns is consistent with the assigned structural formula.

Analytical Data

Calcd. for $C_{10}F_{15}H_4SN$: C, 25.28; F, 60.51; H, 0.85; S, 6.79
Found: C, 25.68; F, 60.92; H, 0.96; S, 7.02

In substantial accord with the procedure of Example 1 chlorine gas is passed into a mixture of 100 g. (0.212 mole) of the above-described $(CF_3)_2CFO(CF_2)_4(CH_2)_2SCN$, 100 g. of acetic acid and 15 g. of water at 70–75° for 4.5 hours. The reaction mixture is filtered to remove by-product crystallized cyanogen chloride and distilled in vacuo to give 110 g. (0.21 mole) of the desired organic sulfonyl chloride, b.p. 86–88°C/3 mm. having the structural formula $$(CF_3)_2CFO(CF_2)_4(CH_2)_2SO_2Cl$$

In infrared spectrum of the product which exhibits a characteristic sulfonyl chloride group absorption band at 7.15–7.25 microns is consistent with the assigned structural formula.

Analytical Data:

Calcd. for $C_9F_{15}H_4ClSO_3$: C, 21.07; F, 55.61; S, 62.4; Cl, 6.92.
Found: C, 21.04; F, 54.12; S, 6.21; Cl, 7.10.

EXAMPLE 3

In substantial accord with the procedure of Example 1, 50 g. (0.51 mole) of potassium thiocyanate and 200 ml. of dimethyl sulfoxide are heated with 160 g. (0.25 mole) of $(CF_3)_2CFO(CF_2CF_2)_3CH_2CH_2I$ at a temperature of 100° for 6 hours. The recovered oil was dried and distilled under diminished pressure to give 130 g. (0.23 mole, 91% yield) of the organic thiocyanate, b.p. 103–105°C/3 mm. Hg. having the structural formula $$(CF_3)_2CFO(CF_2)_6(CH_2)_2SCN$$

The infrared spectrum of this product which exhibits a characteristic thiocyanate absorption band at 4.60–4.62 microns is consistent with the assigned structural formula.

Analytical Data:

Calcd. for $C_{12}F_{19}H_4SN$: C, 25.22; F, 63.22; H, 0.70; S, 5.60.
Found: C, 24.97; F, 63.75; H, 0.79; S, 5.21.

In substantial accord with the procedure of Example 1, chlorine gas is passed continuously for 8 hours into a mixture of 105 g. (0.184 mole) of the above-described $(CF_3)_2CFO(CF_2)_6(CH_2)_2SCN$, 100 g. of acetic acid and 15 g. of water at 55 to 60°. On completion of the chlorine addition the reaction mass is cooled to ambient temperature and filtered to remove crystallized by-product cyanogen chloride. The resultant filtrate is distilled under diminished pressure to give 111 g. (0.18 mole) of the desired organic sulfonyl chloride, b.p. 106°/3 mm Hg. having the structural formula $$(CF_3)_2CFO(CF_2)_6(CH_2)_2SO_2Cl$$

The infrared spectrum of this product which exhibits the characteristic sulfonyl chloride group absorption band at 7.15–7.25 microns is consistent with the assigned structural formula.

Analytical Data:

Calcd. for $C_{11}F_{19}H_4ClSO_3$: C, 21.55; F, 58.94; H, 0.65; Cl, 5.79; S, 5.22.
Found: C, 19.62; F, 58.17; H, 0.58; Cl, 5.89; S, 5.32.

EXAMPLE 4

To a 250 ml. 3-neck flask equipped with a reflux condenser is charged 25 g. (0.062 mole) of $(CF_3)_2CFO(CF_2)_2(CH_2)_2SCN$ prepared as described in Example 1, 50 g. of water, and 100 g. of 70% of aqueous nitric acid. The mixture is heated at 100 to 105° for 15 hours, nitrogen dioxide fumes being emitted from the reflux condenser during the reaction. The resultant reaction mass, which is a clear solution, is cooled to ambient temperature and extracted with four 50 ml. portions of diethyl ether. The resultant ether extracts are combined as washed with two 50 ml. portions of water to remove unreacted nitric acid. On evaporation of the washed extract to dryness, there is obtained 22 g. of tan solid product, m. p. 85–90° having the structural formula $$(CF_3)_2CFO(CF_2)_2(CH_2)_2SO_2OH$$

Analytical Data:

Calcd. for $C_7F_{11}H_5O_4S$: C, 21.32; F, 53.04; H, 1.28; S, 8.12.
Found: C, 21.57; F, 54.02; H, 1.34; S, 7.54.

EXAMPLE 5

In substantial accord with the procedure of Example 4, 50 g (0.10 mole) of $(CF_3)_2CFO(CF_2)_4(CH_2)_2SCN$, prepared as described in Example 2 is heated with 50 g. of water and 100 g. of 70% aqueous nitric acid for 7 hours at 100°. The resultant gelatinous reaction mass is cooled to ambient temperature and extracted with ether as previously described. After being washed with water, the ethereal extract is evaporated to dryness to recover 52 g. of brown solid organic sulfonic acid product, m.p. 103–106° having the structural formula $$(CF_3)_2CFO(CF_2)_4(CH_2)_2SO_2OH$$

Analytical Data:

Calcd. for $C_9F_{15}H_5O_4S$: C, 21.86; F, 57.89; H, 1.01; S, 6.47.
Found: C, 21.05; F, 57.10; H, 1.38; S, 6.12.

EXAMPLE 6

In substantial accord with the procedure of Example 4 50 g (0.088 mole) of $(CF_3)_2CFO(CF_2)_6(CH_2)_2SCN$, prepared as described in Example 3, 50 g. of water, and 100 g. of 70% aqueous nitric acid are heated at 100° for 6 hours. The resultant reaction mass which is a clear solution is worked up as previously described to recover 50 g. of a white solid sulfonic acid, m.p. 140–143° having the structural formula $$(CF_3)_2CFO(CF_2)_6(CH_2)_2SO_2OH$$

Analytical Data:

Calcd. for $C_{11}F_{19}H_5SO_4$: C, 22.22; F, 60.77; H, 0.84; S, 5.38.
Found: C, 21.07; F, 59.65; H, 1.02; S, 5.14.

EXAMPLE 7

A mixture of 50 g. (0.084 mole) of the sulfonic acid product of Example 6 and an aqueous solution containing 13 g. (0.092 mole) of sodium sulfate is agitated at ambient temperature for 5 hours. The reaction mixture is evaporated to dryness and is than extracted with hot aqueous ethanol. After evaporation of the resultant aqueous ethanol extract to dryness under diminished pressure there is obtained 46 g. (0.075 mole) of an organic sodium sulfonate having the structural formula $$(CF_2)_2CFO(CF_2)_6(CH_2)_2SO_2ONa$$

Analytical Data:

Calcd. for $C_{11}F_{19}H_4SO_4Na$: C, 21.43; F, 58.60; Na, 3.73; H, 0.64; S, 5.19.
Found: C, 21.02; F, 58.10; Na, 3.96; H, 0.77; S, 5.09

EXAMPLE 8

A mixture of 10 g. (0.02 mole) of the sulfonic acid product of Example 5 and 25 g. of 28% aqueous ammonia is agitated at ambient temperature for 2 hours. The resultant mixture is evaporated to dryness to give 10 g (0.02 mole) of an organic ammonium sulfonate, m.p. 245–250° having the structural formula $$(CF_3)_2CFO(CF_2)_4(CH_2)_2SO_2ONH_4$$

Analytical Data:

Calcd. for $C_9F_{15}H_8NSO_4$: C, 21.13; F, 55.77; H, 1.54; N, 2.73; S, 6.26.
Found: C, 21.56; F, 56.02; H, 1.29; N, 2.92; S, 6.01.

EXAMPLE 9

To a 300 ml. stainless steel autoclave are charged 100 g. (0.24 mole) of $(CF_3)_2CFOCF_2CF_2I$ and 32 g. (1.0 mole) of sulfur. The autoclave is evacuated, sealed and heated with agitation at about 450° for 12 hours. The autoclave is then allowed to cool to ambient temperature and the liquid contents are discharged and filtered to remove unreacted sulfur and recover as filtrate a crude disulfide of the formula $$(CF_3)_2CFO(CF_2)_2S-S-(CF_2)_2OCF(CF_3)_2$$

which contains minor amounts of the corresponding monosulfide and higher polysulfides.

About 20 g. (0.030 mole) of the crude $(CF_3)_2CFO(CF_2)_2S-S-(CF_2)_2OCF(CF_3)_2$ prepared as described above and 10 g. (0.28 mole) of dry chlorine gas are charged to a 100 ml. Pyrex Carius tube. The tube is evacuated, sealed and exposed to ultraviolet radiation at room temperature for about 12 days. The tube is opened and the contents are distilled to recover as distillate the sulfenyl chloride of the formula $$(CF_3)_2CFO(CF_2)_2SCl$$

About 15 g. (0.041 mole) of $(CF_3)_2CFO(CF_2)_2SCl$ prepared as described above, 5 g. (0.14 mole) of chlorine, and 5 g. (0.28 mole) of water are vigorously agitated in a 100 ml. Pyrex tube at ambient temperature for about 10 days to give gaseous hydrogen chloride and a substantially quantitative yield of the sulfonyl chloride having the formula $$(CF_3)_2CFO(CF_2)_2SO_2Cl$$

EXAMPLE 10

About 20 g. (0.05 mole) of $(CF_3)_2CFO(CF_2)_2SO_2Cl$, prepared as described in Example 9, and 20 ml. of water are charged to a 100 ml. three necked flask and agitated at about 75° for about 12 hours. The resultant aqueous reaction mass containing the sulfonic acid of the formula $$(CF_3)_2CFO(CF_2)_2SO_2OH$$

is then treated with sodium sulfate substantially in accordance with the procedure of Example 7 above to recover the sodium salt of the foregoing sulfonic acid which salt has the formula $$(CF_3)_2CFO(CF_2)_2SO_2ONa$$

EXAMPLE 11

The surface tensions of 0.01, 0.1 and 0.5 weight percent aqueous solutions of the following sulfonyl compounds of the invention are determined on a wetting balance in substantial accord with the method of J. Guastalla, J. Colloid Sci. 11 623 (1956).

The sulfonic acid product of Example 6.
The sulfonic acid product of Example 5.
The sulfonic acid product of Example 4.
The ammonium salt product of Example 8.
The ammonium salt of the sulfonic acid product of Example 4 which is prepared by treating the sulfonic acid product with aqueous ammonia in substantial accord with the procedure of Example 8.

The resulting surface tension measurements are compared with the surface tension of distilled water in the following Table.

TABLE

| Compound | Concentration of Aqueous Solution, Percent | Surface Tensions (Dynes/cm. in distilled water at 25°C) |
|---|---|---|
| Distilled water | — | 72.1 |
| $(CF_3)_2CFO(CF_2)_6(CH_2)_2SO_2OH$ | 0.01 | 27.9 |
|  | 0.1 | 17.1 |
|  | 0.5 | 16.3 |
| $(CF_3)_2CFO(CF_2)_4(CH_2)_2SO_2OH$ | 0.01 | 37.5 |
|  | 0.1 | 16.4 |
|  | 0.5 | 16.8 |
| $(CF_3)_2CFO(CF_2)_2(CH_2)_2SO_2OH$ | 0.01 | 55.5 |
|  | 0.1 | 29.4 |
|  | 0.5 | 19.3 |
| $(CF_3)_2CFO(CF_2)_4(CH_2)_2SO_2O^-NH_4^+$ | 0.01 | 37.3 |
|  | 0.1 | 18.8 |
|  | 0.5 | 16.6 |
| $(CF_3)_2CFO(CF_2)_2(CH_2)_2SO_2O^-NH_4^+$ | 0.01 | 29.6 |
|  | 0.1 | 15.1 |
|  | 0.5 | 14.3 |

The surface tensions of these solutions are compared to that of water in the foregoing Table demonstrate the efficacy of the compounds of the invention as surface active agents.

Additional compounds of the invention which can be prepared in accordance with previously described synthetic techniques include the following representative examples $(CF_3)_2CFOCF_2CH_2SO_2Cl$
$(CF_3)_2CFO(CF_2)_5(CH_2CF_2)_4(CH_2)_2SO_2Cl$
$(CF_3)_2CFOCF_2SO_2F$
$(CF_3)_2CFOCF_2CH_2CF_2SO_2F$
$(CF_3)_2CFO(CF_2)_5SO_2Cl$
$(CF_3)_2CFO(CF_2)_7SO_2F$
$(CF_3)_2CFO(CF_2)_{20}CH_2SO_2OH$
$(CF_3)_2CFO(CF_2)_{40}SO_2OH$
$(CF_3)_2CFOCF_2(CH_2CF_2)_5CH_2SO_2OH$
$(CF_3)_2CFO(CF_2)_3CH_2SO_2OH$
$(C_2F_5)_2CFOCF_2(CF_2CH_2)_4CF_2SO_2OH$
$(CF_2Cl)_2CFO(CF_2)_2(CH_2)_4(CF_2)_7SO_2ONa$
$(CF_3)_2CFOCF_2SO_2F$ $$\begin{matrix} CFCl_2 \\ | \\ FCOO(CF_2)_2(CH_2)_2(CF_2)_3SO_2OLi \\ | \\ (CF_3)_2CF \end{matrix}$$

$(CF_3)_2CFOCF_2SO_2OH$

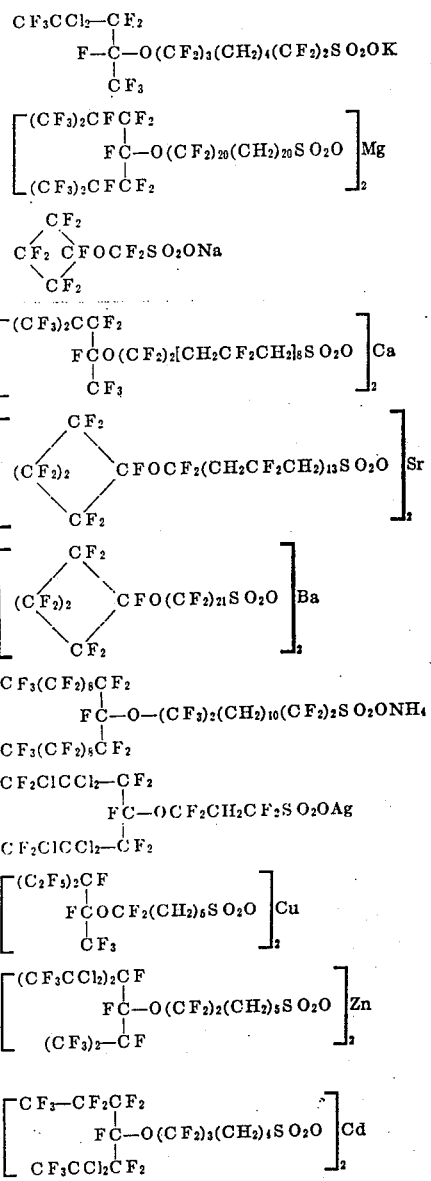

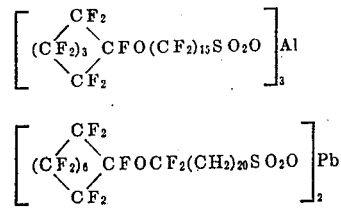

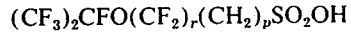

We claim:
1. A member of the group consisting of compounds having the formula

$$(CF_3)_2CFO(CF_2)_r(CH_2)_pSO_2OH$$

wherein $r$ is an integer of from 1 to 20, $p$ is 1 or 2, and the ammonium and Group 1A metal salts thereof.

2. A compound as claimed in claim 1 having the formula $$(CF_3)_2CFO(CF_2)_2(CH_2)_2SO_2OH$$

3. A compound as claimed in claim 1 having the formula $$(CF_3)_2CFO(CF_2)_4(CH_2)_2SO_2OH$$

4. A compound as claimed in claim 1 having the formula $$(CF_3)_2CFO(CF_2)_6(CH_2)_2SO_2OH$$

5. A compound as claimed in claim 1 having the formula $$(CF_3)_2CFO(CF_2)_6(CH_2)_2SO_2ONa$$

6. A compound as claimed in claim 1 having the formula $$(CF_3)_2CFO(CF_2)_4(CH_2)_2SO_2ONH_4$$

* * * * *